(12) United States Patent
Nakajima

(10) Patent No.: US 6,532,208 B2
(45) Date of Patent: Mar. 11, 2003

(54) OPTICAL RECORDING MEDIUM HAVING PREPITS DEEPER THAN GROOVES

(75) Inventor: Junsaku Nakajima, Kashihara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/903,065

(22) Filed: Jul. 10, 2001

(65) Prior Publication Data

US 2002/0006106 A1 Jan. 17, 2002

Related U.S. Application Data

(63) Continuation of application No. 09/585,162, filed on Jun. 1, 2000.

(30) Foreign Application Priority Data

Jun. 4, 1999 (JP) .............................. 11-157406

(51) Int. Cl.$^7$ ................................................ G11B 7/24
(52) U.S. Cl. ................................. 369/275.4; 428/64.4
(58) Field of Search ....................... 369/275.4, 275.2, 369/275.3, 277, 278, 279; 428/64.4, 64.1

(56) References Cited

U.S. PATENT DOCUMENTS

| | | | |
|---|---|---|---|
| 4,734,904 A | | 3/1988 | Imanaka et al. |
| 5,246,531 A | | 9/1993 | Junji et al. |
| 5,407,720 A | * | 4/1995 | Omata ........................ 428/64.4 |
| 5,453,969 A | * | 9/1995 | Psaltis et al. ................. 369/109 |
| 5,559,787 A | * | 9/1996 | Nomoto .................... 369/275.4 |
| 5,602,819 A | * | 2/1997 | Inagaki et al. ................. 369/99 |
| 5,638,354 A | * | 6/1997 | Nakayama et al. ...... 369/275.3 |
| 5,896,366 A | * | 4/1999 | Ogawa .................... 369/275.4 |
| 5,926,446 A | * | 7/1999 | Shimizu ................... 369/275.4 |
| 6,038,207 A | * | 3/2000 | Wachi ....................... 369/275.1 |
| 6,128,271 A | * | 10/2000 | Ohta ....................... 369/275.4 |

FOREIGN PATENT DOCUMENTS

| | | |
|---|---|---|
| CA | 2062840 | 9/1992 |
| EP | 0 414 429 A | 2/1991 |
| EP | 0 546 525 | 12/1992 |
| JP | 05-166229 | 7/1993 |
| JP | 7-192273 | 7/1995 |
| JP | 09-035334 | 2/1997 |

\* cited by examiner

Primary Examiner—Tan Dinh
(74) Attorney, Agent, or Firm—David G. Conlin; William J. Daley, Jr.; Edwards & Angell, LLP

(57) ABSTRACT

In an optical recording medium in which marks are allowed to be written at grooves and information has been recorded beforehand in the form of prepits, the depth of the grooves, Dg, and the depth of the prepits, Dp, satisfy the following relationships, respectively:

$$Dg < \lambda/8n,$$

and $$\lambda/8n < Dp < \lambda/4n$$

where $\lambda$ is a wavelength of light to be used for recording/reproducing of information signals, and n is an index of refraction of the substrate of the optical recording medium.

7 Claims, 7 Drawing Sheets

OPTICAL RECORDING MEDIUM HAVING PREPITS DEEPER THAN GROOVES

This application is a continuation of co-pending U.S. application Ser. No. 09/585,162, filed Jun. 1, 2000, the teachings of which are incorporated herein by reference.

BACKGROUND OF THE INVENTION

The present invention relates to recordable (once-writable) and rewritable information-recording media, and more particularly, to optical discs.

Recently, the densification of such optical discs, which are used as recording devices for computers, or package media for music and image information, has been advanced. In order to have precise, high-speed access to such high-density tracks, it is necessary to provide preformatted signals having address information to a recording surface of the optical disc, to and from which surface information is recorded and reproduced. Further, information that one does not want to erase can also be formed in advance as preformatted signals on the disc. Portions other than the preformatted portions are a recording area in which guide grooves referred to as simply 'grooves' are formed. In the recording area, grooves that are concave portions and lands that are not concave portions exist.

FIGS. 7A and 7B show a disc of related art, and are a top view and a perspective view of the disc, respectively. In FIG. 7B, a cross section of the disc is also shown. Reference symbols 'G' and 'L' indicate a groove and a land, respectively. Reference symbol 'PP' indicates a prepit. Light 3 is condensed by a lens 2 and then incident through a substrate 1. Comparing the land with the groove, the groove is nearer to the lens 2.

On the land, groove and prepit, a recording layer of a material represented by a magneto-optical material, a phase-change material or an organic dye material is formed (not shown in the figures). In the figures, a recording mark M is written in the groove. This is because better signals in quality are obtained when the information is written in the grooves than when written on the lands.

When recording/reproducing information onto/from the optical disc on which the guide grooves are formed as described above, tracking is implemented by a push-pull method. A light beam spot tracks on the grooves and prepits.

The shallower the depth of the groove, Dg, is, the larger signal amplitude of the marks written to the grooves is achieved, resulting in a good S/N ratio. Accordingly, as the discs become more densified, they are adjusted such that the depth of groove, Dg, is smaller, to thereby obtain signals with a good S/N ratio.

On the other hand, when Dp is λ/4n, the amplitude of the prepit signal reaches its maximum. In the shallower prepit, the signal amplitude becomes smaller. Therefore, when both of Dg and Dp are adjusted to be small, or shallow, the prepit signals become too small, resulting in difficulty in reading the preformatted information that one does not want to erase, such as address information.

Also, when recorded on shallow prepits by mistake, since the amplitude of signals of written marks is larger than that of the original prepit signals, the information that has been originally preformatted as ROM information becomes unreadable. To make the matter worse, the ROM information goes rewritten, and thus a serious defect occurs in the reliability of the disc.

Furthermore, in the disc in which Dg=Dp, the magnitude of the push-pull signal in the prepit area is smaller than that of the push-pull signal in the groove area. Accordingly, if the gain of tracking is adjusted so that it is suitable for the groove area, the amplitude of the push-pull signals in the prepit portions becomes too small. Therefore, the control precision in the tracking servo deteriorates. In contrast, if the gain of tracking is adapted to the prepit area, the amplitude of the push-pull signal in the groove area becomes excessively large. Thus, disadvantageously, oscillation occurs in the tracking servo system.

In order to solve such problems, it is thinkable to switch the gain of tracking every time the beam spot reaches each of the groove and prepit areas. However, this will invite the complication of the circuitry of the recording/reproducing apparatus for the discs and thus may increase the costs of the apparatus.

SUMMARY OF THE INVENTION

The present invention has been made in order to solve the above problems, and the object of the present invention is to provide a highly reliable optical recording medium with prepits wherein recording is implemented at least at grooves, signals from the recorded marks and signals from the prepits have magnitudes large enough to obtain high reliability, and push-pull signals obtained in the groove and prepit portions have similar magnitudes so that precise tracking can be implemented, whereby complication of the circuitry of a recording/reproducing device and the increase of the costs of such a device can be avoided.

According to an aspect of the present invention, there is provided an optical recording medium, comprising a substrate having a recording area, composed at least of lands and grooves, and a prepit area in which information has been recorded beforehand in the form of prepits, said recording area being recordable at least at the grooves among said lands and grooves, said optical recording medium being constructed such that a depth of each groove, Dg, and a depth of each prepit, Dp, satisfy the following relationship:

$$Dg < \lambda/8n,$$

and $$\lambda/8n < Dp < \lambda/4n,$$

respectively,
where λ is a wavelength of light to be used for recording/reproducing of information signals, and n is an index of refraction of the substrate of the optical recording medium.

In the optical recording medium with the above arrangement, an RF signal having a large amplitude is obtained from both of the preformatted area (prepits) and the marks recorded at the grooves. At the same time, if overwrite occurs at the prepits, the overwrite has less influence on the reproduction of the prepit information, resulting in an improvement in the reliability of data.

In one embodiment, the depth of the grooves and the depth of the prepits have been adjusted so that a difference between a magnitude of a push-pull signal from the recording area and that of a push-pull signal from the prepit area is as small as possible.

With this arrangement, the amplitude of the push-pull signal from the recording area and that of the push-pull signal from the prepit area are made almost equal to each other. Thus, it becomes possible to achieve accurate tracking. Accordingly, there is an effect that it is possible to prevent the complication of the circuit and the increase in the cost of the recording/reproducing apparatus for the optical recording medium.

Preferably, the grooves and prepits may also satisfy the relationship of $(\lambda/8n-Dg)>(Dp-\lambda/8n)$ According to another aspect of the invention, there is provided an optical recording medium, comprising a substrate having a recording area, composed at least of lands and grooves, and a prepit area in which information has been recorded beforehand in the form of prepits, said recording area being recordable at least at the grooves among said lands and grooves, wherein the prepits having a depth different from a depth of the grooves are provided on an imaginary line extending from each of at least part of the grooves.

The depth of the prepits may be, preferably, larger than the depth of the grooves Other objects, features and advantages of the present invention will be obvious from the following description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Hereinafter, a concrete example to which the present invention has been applied and a comparative example will be described in detail with reference to the drawings.

Using an optical system comprising a laser beam having a wavelength of 650 nm and a lens with an NA (numerical aperture) of 0.6, experiments were conducted on discs having various groove depths (Dg) and prepit depths (Dp), at a tracking pitch (the distance between grooves) of 0.74 $\mu$m. The grooves G and prepits PP each have a width of 0.5 $\mu$m. For the recording layer, GeSbTe, which is a phase-changing material, was used. Each disc was rotated at a linear velocity of 3.5 m/s for recording and reproducing.

Comparative Example

First, discs having different groove depths, Dg, and prepit depths, Dp, in which Dg=Dp, were examined as to the relationship between the groove depth, Dg, and the amplitude of a signal of a 0.3 $\mu$m-long mark, which had been written at the groove, and the relationship between the prepit depth, Dp, the prepit being 0.3 $\mu$m long, and the amplitude of the prepit signal. The results thereof are shown in FIG. 1.

Figure 2:
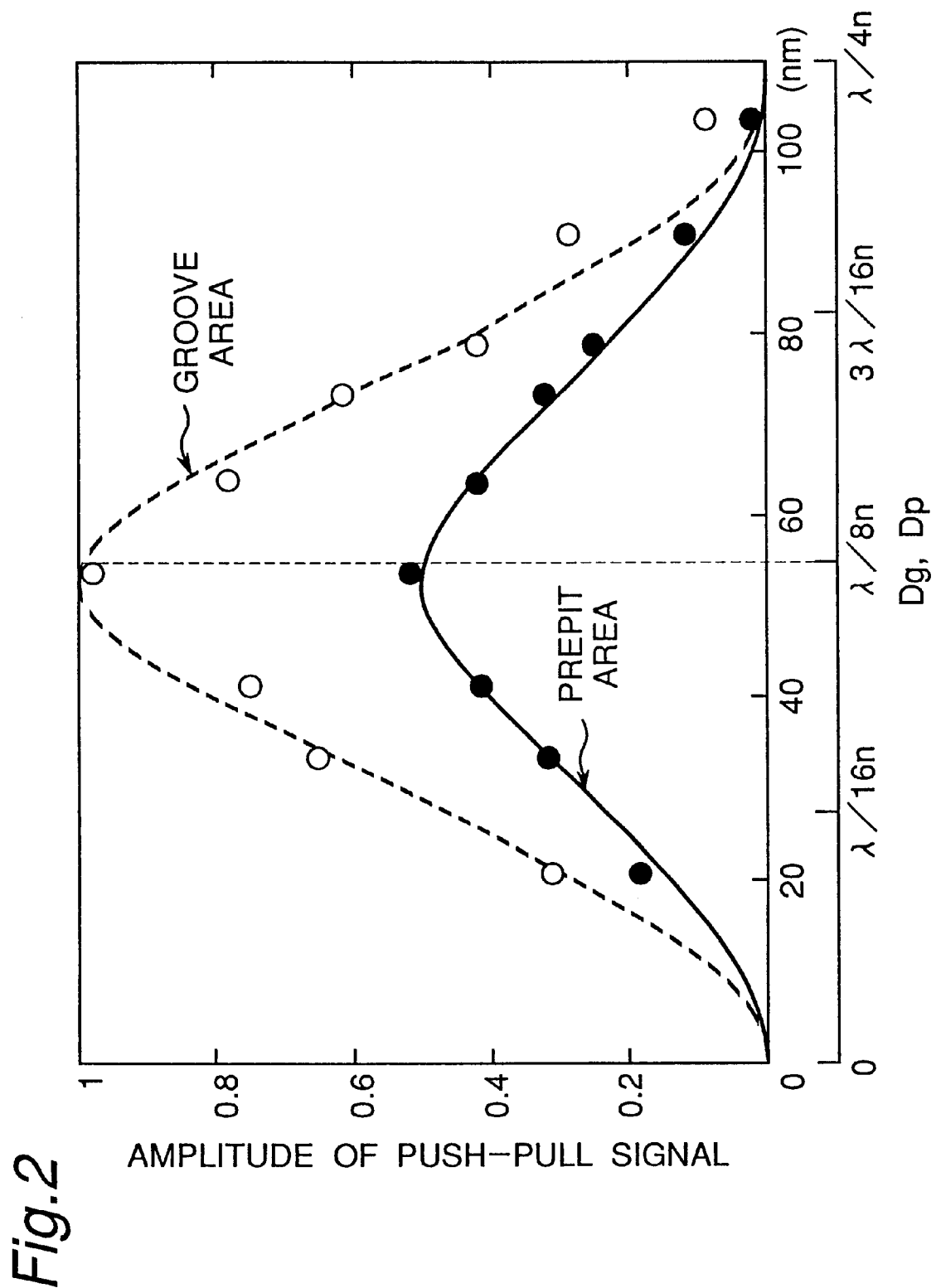
FIG. 2 is a graph showing the relationship between the groove and prepit depths and the amplitude of the push-pull signal.

The shallower the groove depth, Dg, is, the larger amplitude was obtained, resulting in a good S/N ratio. This indicates that it is advantageous to make the groove depth, Dg, smaller to obtain signals with a good S/N ratio. This applies especially to high-density discs. FIG. 2 indicates the relationship between the groove and prepit depths and the amplitude of the push-pull signal. The amplitude of the push-pull signal reaches its maximum when Dg and Dp are each $\lambda/8n$.

According to FIG. 2, for the precision of tracking, a groove having a depth of $\lambda/8n$ is preferable from the viewpoint of a large-magnitude push-pull signal. However, considering the amplitude of the mark signal (FIG. 1) also, a value of smaller than $\lambda/8n$ should be selected as the groove depth, Dg, for an attempt to achieve as good an S/N ratio as possible in both of the push-pull signal and the written marks.

Figure 1:
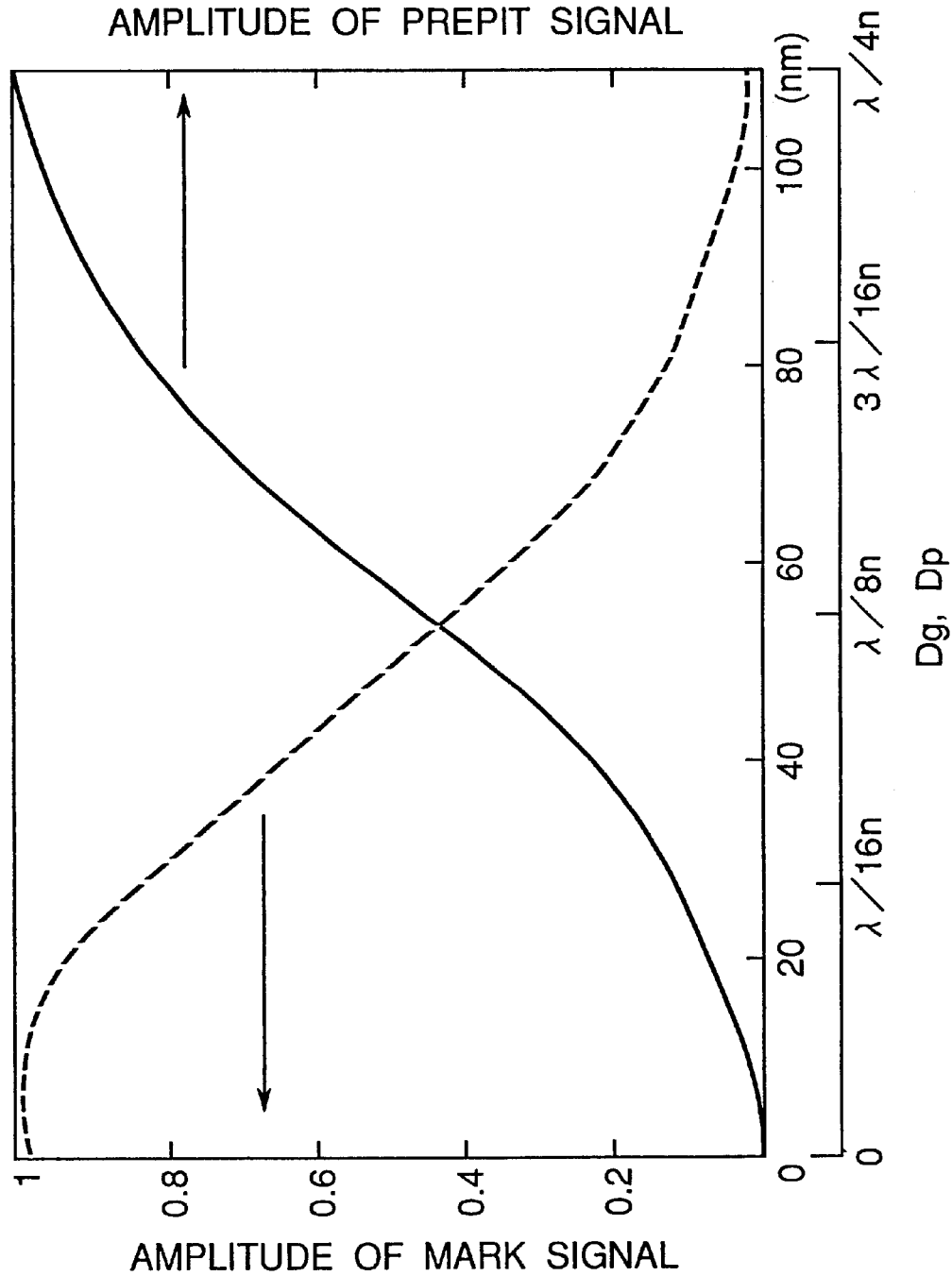
FIG. 1 is a graph showing the relationship between the groove and prepit depths and the amplitudes of RF signals.

On the other hand, from the relationship between the depth of the prepit, Dp, and the amplitude of the prepit signal shown in FIG. 1, when Dp is $\lambda/4n$, the amplitude of the prepit signal reaches its maximum. In the shallower prepits, the amplitude of the signal becomes smaller.

From these things as above, in the discs in which Dg=Dp, when selecting a depth of smaller than $\lambda/8n$ for the grooves and prepits so as to make the S/N ratio in the push-pull signal compatible with the S/N ration in the written mark, the magnitude of the prepit signal becomes low. Thus, it becomes difficult to read the information that one wants to fix without erasing like read-only information, e.g., preformatted address information.

Figure 3:
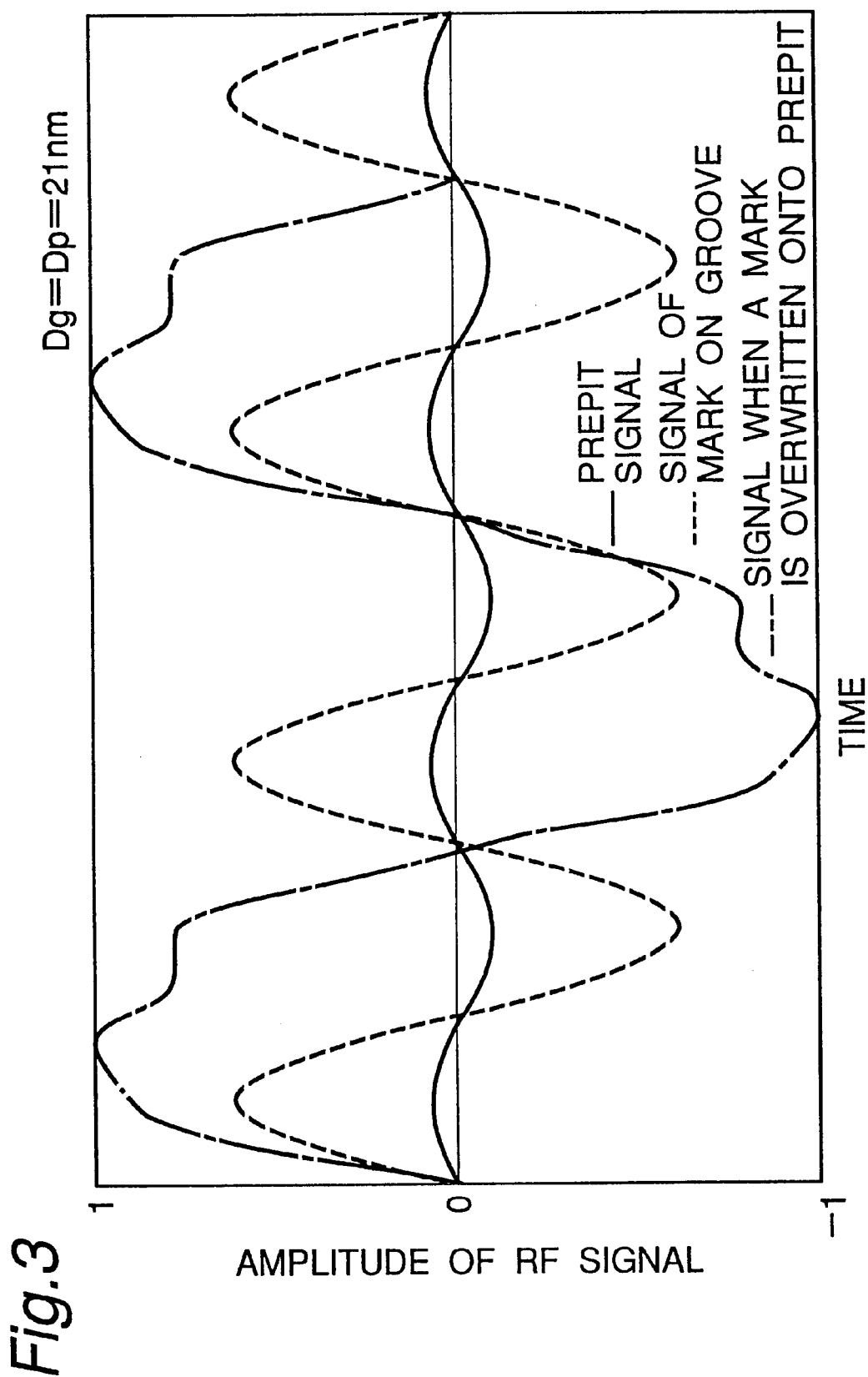
FIG. 3 shows the RF signal of a prepit in the shallow prepit area, the RF signal when information is overwritten over the prepit, and the mark signal written on the groove.

FIG. 3 shows a prepit signal of a 0.3 $\mu$m-long prepit, a signal when a 0.6 $\mu$m-long mark was overwritten on the prepit, and a signal of a 0.3 $\mu$m-long mark written on a groove in connection with a disc in which Dg=Dp−21 nm (=$\lambda/20n$), which is one of those discs subjected to experiment.

First, from FIG. 3, compared with the signal derived from the mark written on the groove, the amplitude of the prepit signal is small, thus it is difficult to read prepit information. The information is stored as information on time at which the reproduced signal zero-crosses. However, it turns out form the figure that if a mark is recorded on the prepit by mistake, not only does it become impossible to read the information which originally has been preformatted as ROM information, but also the ROM information goes rewritten.

Furthermore, in the disc, the amplitude of the push-pull signal is different between the groove and prepit portions. Thus, the problems as described above occur.

[Embodiment]

Figure 4:
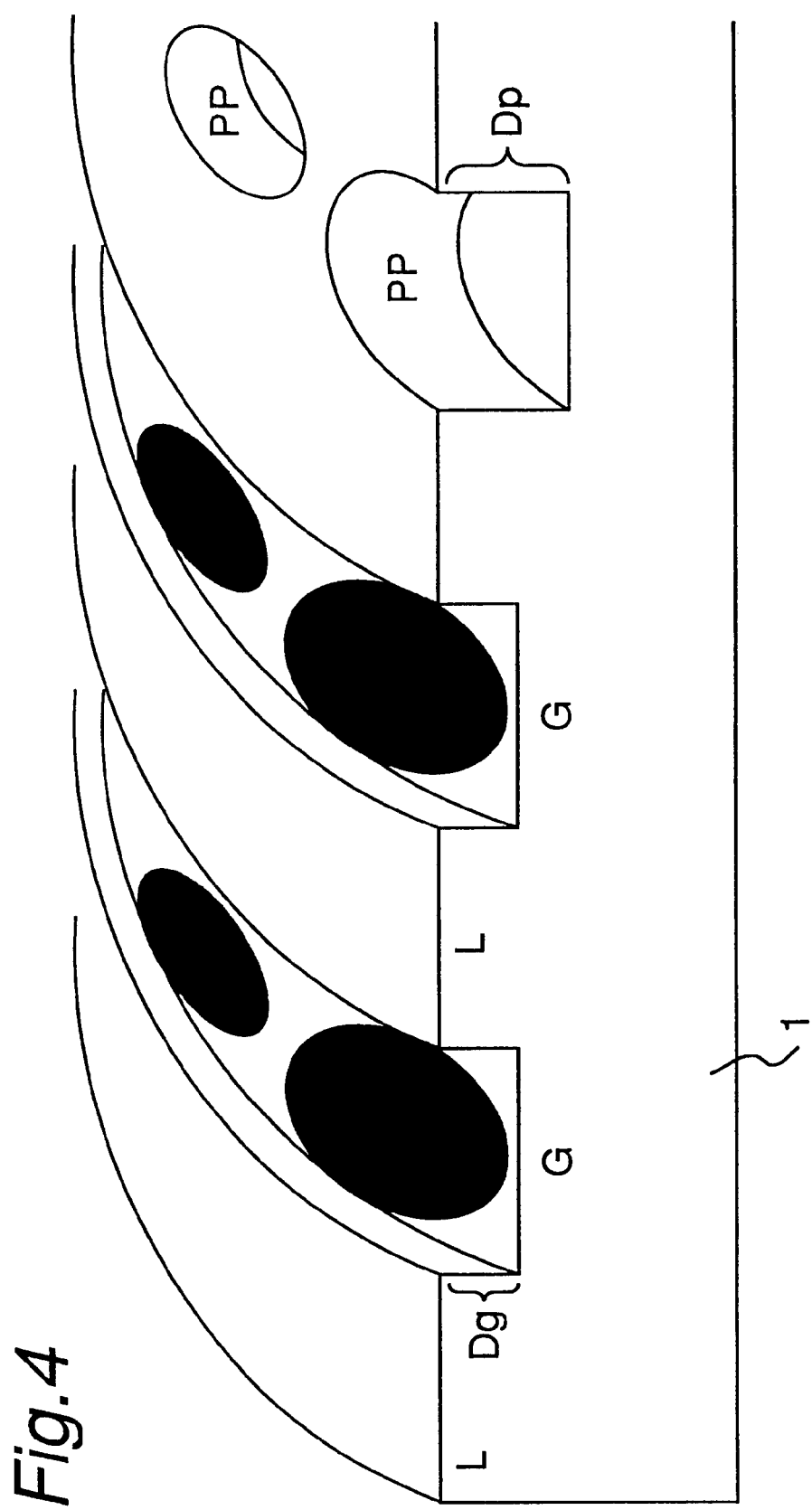
FIG. 4 schematically shows an optical recording medium according to the present invention.
Figure 6:
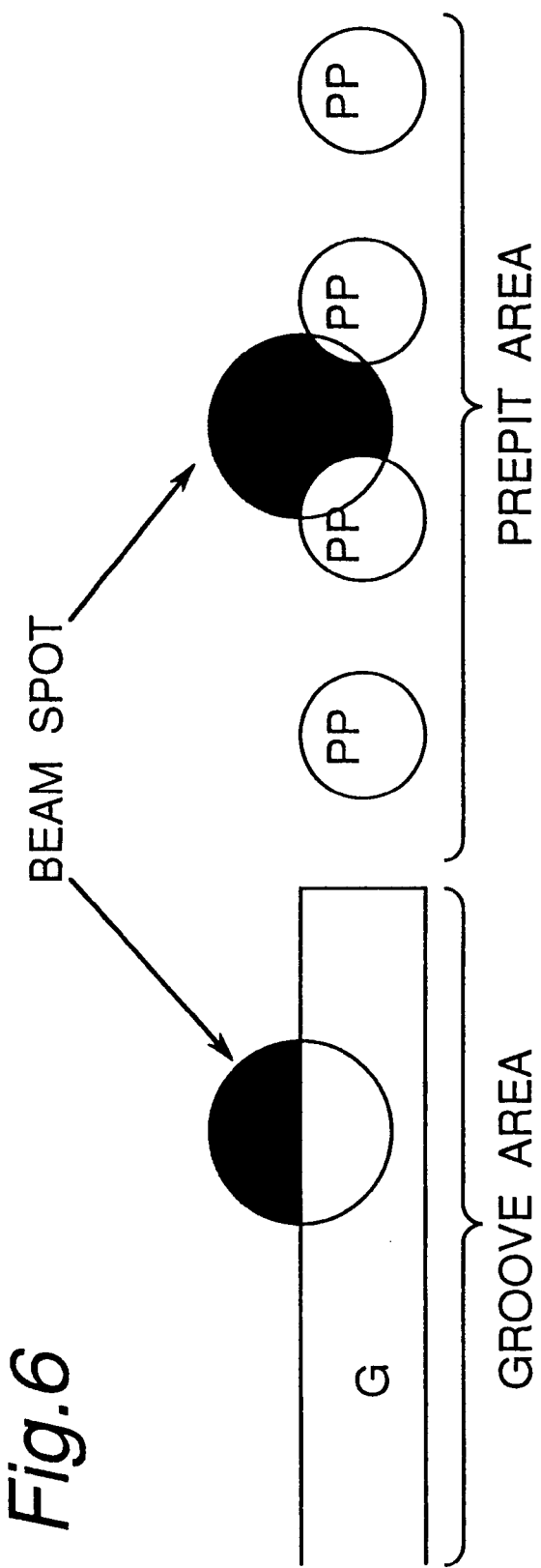
FIG. 6 is an illustration for explaining that the amplitude of the push-pull signal is different between the prepit area and the groove area.
Figure 7A:
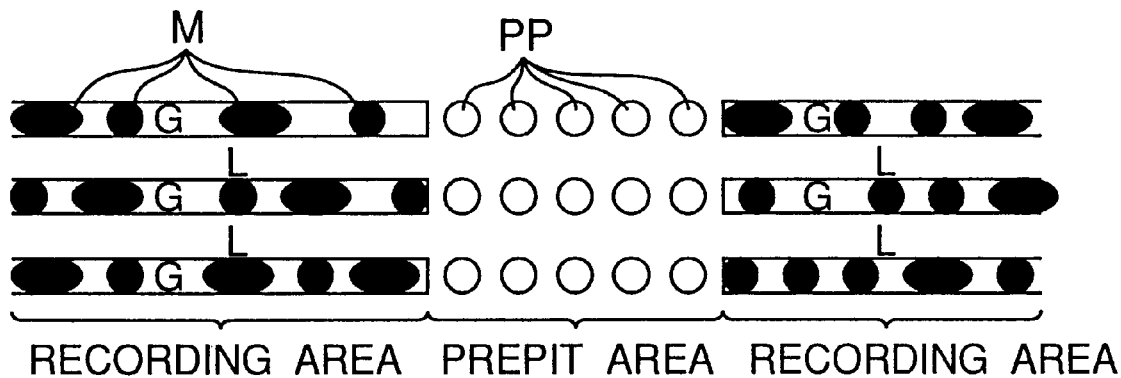
FIGS. 7A and 7B schematically show an optical recording medium according to related art.
Figure 7B:
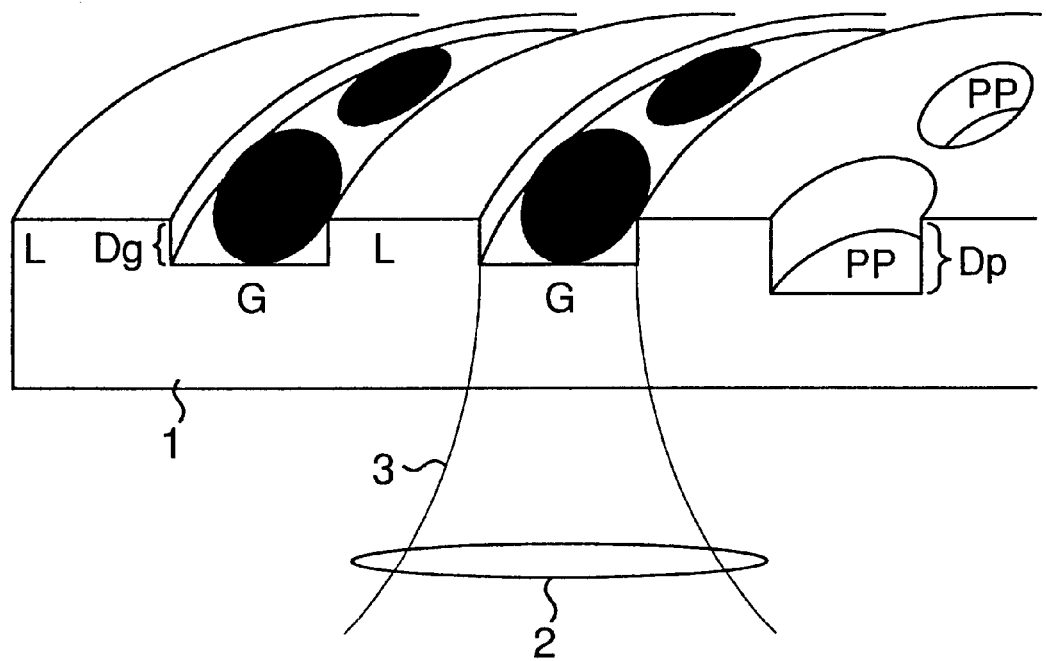

Accordingly, discs in which Dg and Dp are different from each other as shown in FIG. 4 were prepared. By using the methods as disclosed in U.S. Pat. No. 5,246,531 and Canadian Patent 2062840, discs in which Dg and Dp are different can be prepared. In each disc prepared, the grooves G (hence, the lands L as well) are disposed swirlingly or concentrically, and the prepits PP are disposed on an imaginary line extending from each of various grooves G. (See FIGS. 6 and 7, though only one groove is shown in FIG. 6.)

Figure 5:
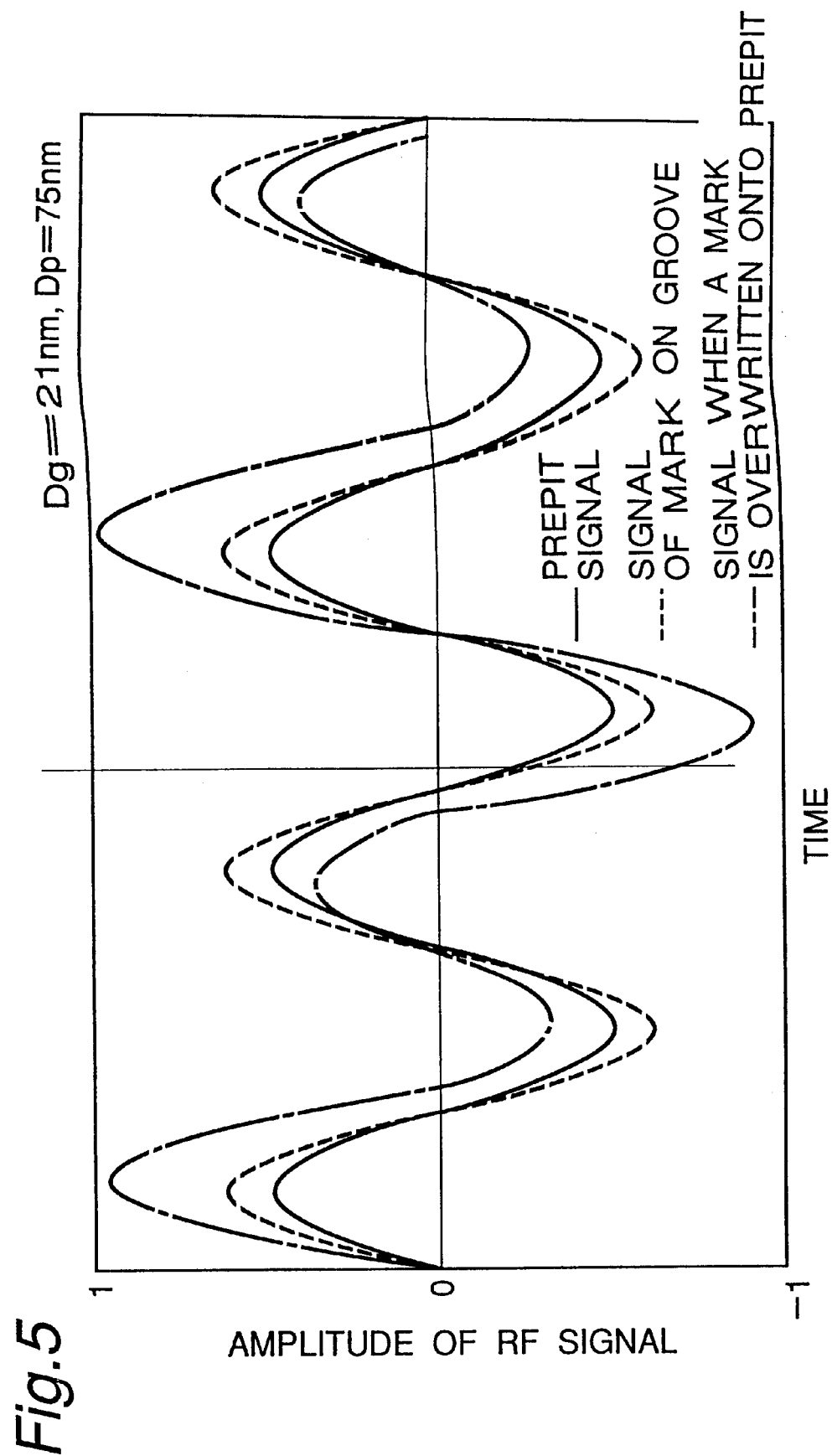
FIG. 5 shows the RF signal of the prepit in the deep prepit area and the RF signal when information is overwritten on the prepit.

FIG. 5 shows a prepit signal of the prepit 0.3 $\mu$m long, a signal when a 0.6 $\mu$m-long mark was overwritten on the prepit, and a signal of a 0.3 $\mu$m-long mark written on the groove in a disc in which Dg=21 nm and Dp=75 nm.

The substrate of the disc used has a refractive index (n) of 1.5, the wavelength ($\lambda$) of the light used for recording and producing is 650 nm. Because ($\lambda/8n$)=54 nm and ($\lambda/4n$)=108 nm, the disc satisfies both of the conditions:

$Dg<(\lambda/8n)$;

and $(\lambda/8n)<Dp<(\lambda/4n)$.

The amplitude of the mark signal written on the groove is substantially equal to that of the prepit signal. Thus, it turns out that the reliability of prepit information is higher compared with Comparative Example. Further, the amplitude of the prepit signal is large. Therefore, even if information is recorded on the prepit by mistake, the original information preformatted as ROM, though not completely, remains on the prepit. Thus, the preformatted information is at least not rewritten.

That is, according to the present invention, both of the information recorded on the groove as a mark and the information recorded in the form of prepit have sufficient signal quality. At the same time, even in the case where the mark is recorded on the prepit on purpose or by mistake, there is no serious influence upon the prepit information, thus data represented by the prepit is reproducible. This is extremely important considering that general information which is invariant and has greater significance and high possibility of being frequently referred to, such as sector address numbers and control information for the optical disk, is recorded in the form of the prepit in general.

Next, in order to examine the relationship between the depth of the prepit and the endurance, or resistance to overwrite, discs having a fixed groove depth, Dg=21 nm, and various prepit depths, Dp, were prepared. The error rate of the prepit information and the error rate of the overwritten information, both obtained when overwriting information on the prepit, were examined. The results thereof are summarized in Table 1. Information is assigned to the mark edge when 8–16 modulated, with the shortest mark length being 0.3 μm. Both the prepit length and the mark length have been similarly modulated.

TABLE 1

Dg = 21 nm

| Dp (nm) | ERROR RATE OF PREPIT INFORMATION | ERROR RATE OF OVERWRITTEN INFORMATION |
| --- | --- | --- |
| 21 | $1 \times 10^{-2}$ | $5 \times 10^{-3}$ |
| 35 | $2 \times 10^{-2}$ | $1 \times 10^{-3}$ |
| 42 | $3 \times 10^{-2}$ | $4 \times 10^{-2}$ |
| 54 ($\lambda/8$ n) | $5 \times 10^{-2}$ | $2 \times 10^{-2}$ |
| 66 | $1 \times 10^{-3}$ | $1 \times 10^{-2}$ |
| 75 | $4 \times 10^{-3}$ | $9.5 \times 10^{-1}$ |
| 80 | $7 \times 10^{-3}$ | $9 \times 10^{-1}$ |
| 93 | $9 \times 10^{-3}$ | $8 \times 10^{-1}$ |
| 104 | $1 \times 10^{-4}$ | $7 \times 10^{-1}$ |

From the results, it is apparent that, when Dp is small, namely, the prepit is shallow, prepit information is susceptible to overwrite, and that the deeper prepits, or larger values of Dp, result in the opposite to the above.

Namely, if the depth of the prepit, Dp, is so large and gets closer to ($\lambda/4n$), the resistance, or durability, to overwrite is enhanced. According to the present invention, the depth of the prepit and that of the groove can be separately set. Therefore, an optical recording medium having high resistance to overwrite is easily produced.

As already described, according to the present invention, it is possible to satisfy the preferable conditions for the amplitude of the signal recorded as a mark on the groove, the amplitude of the prepit signal, and the resistance of the prepit signal to overwrite. Furthermore, in the present invention, it is also possible to select the depths of the grooves and prepits in such a manner that the amplitudes of the push-pull signals, which are tracking servo control signals in the grooves and prepits, are equally maintained in both of the groove and prepit areas.

As is apparent from FIG. 2, even if recesses having the same depth are formed in the groove and prepit areas, the amplitudes of the push-pull signals in the grooves and prepits are different from each other. In brief, this is because the areas of the concave and convex portions that exist in the beam spot are different between the groove and prepit areas, as seen from FIG. 6. In the figure, the portions that are indicated with black painting are the concave portions as viewed from the side from which a beam spot is applied.

In general, as shown in FIG. 6, when the beam spot is on the edge of the groove, the amplitude of the push-pull signal reaches its maximum. This is because the area irradiated with the beam spot is approximately halved between the concave and convex portions. Then, the beams reflected by these portions are mutually interfered. Thus, the amplitude of the push-pull signal, which is the difference of the diffracted beams as the result of their mutual interference, becomes large.

On the other hand, in the prepit portions, the area of the convex portion and the area of the concave portion irradiated with a beam spot become unbalanced. If a prepit is formed with its depth equal to that of the groove, then the amount of beams to be diffracted among the reflected beams is reduced. Thus, the amplitude of the push-pull signal becomes smaller, compared with the groove portions.

Table 2 shows values of the amplitude of the push-pull signal in the groove and prepit portions, which were obtained when Dg=21 nm and Dp was changed. The values shown therein have been normalized using, as a value of 1, the amplitude of the push-pull signal in the groove portion when the Dg was 54 nm at which the largest push-pull signal was obtained.

TABLE 2

Dg = 21 nm

| Dp (nm) | AMPLITUDE OF PUSH-PULL SIGNAL IN GROOVE AREA | AMPLITUDE OF PUSH-PULL SIGNAL IN PREPIT AREA |
| --- | --- | --- |
| 21 | 0.35 | 0.20 |
| 35 | | 0.32 |
| 42 | | 0.43 |
| 54 ($\lambda/8$ n) | | 0.52 |
| 66 | | 0.43 |
| 75 | | 0.33 |
| 80 | | 0.23 |
| 93 | | 0.16 |
| 104 | | <0.10 |

From the above results, in order to obtain a push-pull signal in the prepit portions that has a similar amplitude to the amplitude of the push-pull signal in the groove portion of Dg=21 nm, Dp should be around 35 nm or 75 nm.

However, in order to improve the reliability of the data by increasing the amplitude of the data signal and the resistance to overwrite in the prepit portions, the prepit depth, Dp, is preferably closer to $\lambda/4n$, as also seen from FIG. 1 and Table 1. Dp=35 nm is compared with Dp=75 nm from this point of view. When selecting Dp=75 nm, the reliability of the prepit signal and the continuity of the amplitude of the push-pull signal between the groove and prepit areas can be secured.

The choice of Dp between 35 nm and 75 nm will be discussed again with reference to FIG. 2. In the example described above, there are two points, i.e., Dp=35 nm and Dp=75 nm, at which a push-pull signal derived from the prepit is of an amplitude approximately equal to that of the push-pull signal derived from the groove Dg of 21 nm. In FIG. 2, on the axis of abscissas representing the depths of grooves and prepits, Dg and Dp, those two points are at the positions almost symmetrical with respect to the point of 54 nm (i.e., $\lambda/8n$).

On the other hand, besides the depth of the groove Dg of 21 nm, there exists another point around Dg of 85 nm at which a push-pull signal of a similar magnitude is derived from the groove portion. These points are also at the positions almost symmetrical with respect to the point of 54 nm ($\lambda/8n$) on the axis of abscissas representing the depths of grooves and prepits, Dg and Dp in FIG. 2. However, from the discussion heretofore held, a shallower groove is preferable from the viewpoint of the quality of reproduced signals of the marks, thus Dg=21 nm should be selected, while a deeper prepit is preferable from the viewpoint of the quality of reproduced prepit signals, thus Dp=75 nm should be selected.

Checking those depths from the viewpoint of the difference or distance from $\lambda/8n$ in FIG. 2, it is also possible to say that the preferable depth is selected so that the following relationship is always satisfied.

$$(\lambda/8n)-Dg>Dp-(\lambda/8n)$$

The above examples have been explained in connection with only the discs in which data are recorded only on groove portions. It is also possible to record data on lands besides the grooves, and thus the present invention is applicable to so-called land-groove recording discs.

Further, in the examples, an optical system having a wavelength of 650 nm and a numerical aperture (NA) of 0.6 is used. It is evident, however, that the effects of the present invention are not limited by the optical system. Furthermore, the groove depth and prepit depth are not limited to the values shown above. Needless to say, following the gist of the present invention, it is possible to arrange various combinations of depths within the range as set forth in claims.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An optical recording medium, comprising a substrate having a recording area, composed at least of lands and grooves, and a prepit area in which information has been recorded beforehand in the form of prepits, said recording area being recordable at least at the grooves among said lands and grooves, said optical recording medium being constructed such that a depth of each groove, Dg, and a depth of each prepit, Dp, satisfy the following relationships, respectively:

$$Dg<\lambda/8n,$$

and $$\lambda/8n<Dp<\lambda/4n$$

where $\lambda$ is a wavelength of light to be used for recording/reproducing of information signals, and n is an index of refraction of the substrate of the optical recording medium.

2. The optical recording medium according to claim 1, wherein the depth of the groove and the depth of the prepit have been adjusted so that a difference between a magnitude of a push-pull signal from the recording area and that of a push-pull signal from the prepit area is as small as possible.

3. The optical recording medium according to claim 1, wherein said grooves and prepits also satisfy the relationship of $(\lambda/8n-Dg)>(Dp-\lambda/8n)$.

4. An optical recording medium, comprising:
a substrate having a recording area, composed at least of lands and grooves and a prepit area in which information has been recorded beforehand in the form of prepits;
said recording area being recordable at least at the grooves among said lands and grooves;
said optical recording medium being constructed such that a depth of each groove, Dg, and a depth of each prepit, Dp, satisfy the following relationships, respectively:

$$Dg<\lambda/8n, \text{ and } \lambda/8n<Dp<\lambda/4n$$

where $\lambda$ is a wavelength of light to be used for recording/reproducing of information signals, and n is an index of refraction of the substrate of the optical recording medium; and
wherein the depth of the groove and the depth of the prepit have been adjusted so that a difference between a magnitude of a push-pull signal from the recording area and that of a push-pull signal from the prepit area is as small as the same gain of tracking servo can be applied in both the recording area and the prepit area.

5. The optical recording medium according to claim 1, wherein the prepits are provided on an imaginary line extending from each of at least part of the grooves.

6. The optical recording medium according to claim 4, wherein the prepits are provided on an imaginary line extending from each of at least part of the grooves.

7. An optical recording medium, comprising:
a recording area composed at least of lands and grooves;
a prepit area in which information has been recorded beforehand in the form of prepits; and
wherein a depth of each groove and a depth of each prepit have been adjusted so that a difference between a magnitude of a push-pull signal from the recording area and that of a push-pull signal from the prepit area is as small as the same gain of tracking servo can be applied in both the recording area and the prepit area.

* * * * *